United States Patent [19]

Fukuda et al.

[11] Patent Number: 5,294,682
[45] Date of Patent: Mar. 15, 1994

[54] POLYESTER RESIN AND TONER BINDER EMPLOYED THE SAME

[75] Inventors: Masao Fukuda; Takemi Nitta, both of Kyoto, Japan

[73] Assignee: Sanyo Chemical Industries, Ltd., Kyoto, Japan

[21] Appl. No.: 913,365

[22] Filed: Jul. 15, 1992

[30] Foreign Application Priority Data

Jul. 18, 1991 [JP] Japan .................. 3-203201

[51] Int. Cl.$^5$ .......... C08F 20/00; G03G 9/087
[52] U.S. Cl. .................. 525/442; 430/106; 430/106.6; 430/109; 430/110; 528/297; 528/300
[58] Field of Search .......... 430/99, 106, 106.6, 430/109, 110, 111, 124, 125, 126; 525/195, 176, 272, 296, 437, 438, 442, 444

[56] References Cited

U.S. PATENT DOCUMENTS

| 1,867,583 | 7/1932 | Moore et al. |
|---|---|---|
| 3,244,770 | 4/1966 | Kirkpatrick et al. |
| 3,458,477 | 7/1969 | Ford et al. |
| 3,681,106 | 8/1972 | Burns et al. .......... 430/109 |
| 4,137,265 | 1/1979 | Edwards et al. ...... 521/167 |
| 4,387,211 | 6/1983 | Yasuda et al. ........ 430/109 |
| 4,533,614 | 8/1985 | Fukumoto et al. .... 430/99 |
| 4,657,837 | 4/1987 | Morita et al. ........ 430/109 |
| 4,804,622 | 2/1989 | Tanaka et al. ........ 430/109 |
| 4,868,085 | 9/1989 | Aita ..................... 430/126 |
| 4,957,774 | 9/1990 | Doi et al. ............. 430/109 |

FOREIGN PATENT DOCUMENTS

| 2030090 | 6/1970 | Fed. Rep. of Germany . |
|---|---|---|
| 2256444 | 12/1974 | France . |
| 1211208 | 10/1967 | United Kingdom . |
| 1213681 | 2/1968 | United Kingdom . |
| 1308136 | 6/1969 | United Kingdom . |
| 1462220 | 12/1974 | United Kingdom . |

OTHER PUBLICATIONS

RAPRA Abstracts, Jun. 1970, vol. 5, No. 6, Oxford GB, p. 4248 Mikhailova et al. "Unsaturated Oligoesters Based On Novolak Type PF Resins".

Primary Examiner—John Kight, III
Assistant Examiner—Shelley A. Dodson
Attorney, Agent, or Firm—Birch, Stewart, Kolasch & Birch

[57] ABSTRACT

Polyester resin for a toner binder obtained by a reaction employing a polycarboxylic acid or its derivative, and a polyol comprising a phenolic resin possessing an oxyalkylene unit. This polyester resin applied for a toner binder for electrophotography which is excellent for fixing at low temperature and resistance to offset at elevated temperature.

19 Claims, No Drawings

POLYESTER RESIN AND TONER BINDER EMPLOYED THE SAME

BACKGROUND OF THE INVENTION

This application claims the priority of Japanese Application No. Hei. 3-203201 filed on Jul. 18, 1991, which is incorporated herein by reference.

FIELD OF THE INVENTION

This invention relates to a new polyester resin, a toner binder and a toner for electrophotography wherein said polyester resin is employed.

DESCRIPTION OF THE RELATED ART

In a method of electrophotography, an electrostatic latent image is generated onto photosensitives, the image is developed with a dry toner, the toner image is transferred onto a sheet of copying paper, then heat-fixing is applied onto the image, and there is obtained a duplication.

Conventionally, as a toner binder which is a component of this dry toner, polystyrene resin, styrene-acrylic copolymer, polyester resin, epoxy resin and the like were generally used. Among these resins, polystyrene series resin such as polystyrene resin, styrene-acrylic copolymer, e.g., were widely used because of their performance of thermoplasticity, grindability, certain electrostatic charge, e.g., and moreover low cost. Recently, polyester resin whose fixability at low temperature is excellent is replacing styrene resin, especially cross-linked polyester resins are remarkable. As polyester resin of this type, J. P. Burns et al. disclose in the U.S. Pat. No. 3,681,106, a polyester resin which employs an alkylene oxide adduct of polyhydric alcohol of trihydric or higher, for example, trimethylol propane, pentaerythritol, and the like. H. Morita et al. propose in U.S. Pat. No. 4,657,837 that there is a polyester resin which employs trimellitic acid. However, the above mentioned polyester resin has problems wherein resistance to offset and/or fixability at low temperature is insufficient for practical use.

SUMMARY OF THE INVENTION

Accordingly, the inventors made an examination to obtain a toner binder being excellent in fixability at low temperature and in resistance to offset as a main object which resulted in the polyester resin of this invention. The polyester resin of this invention is produced by reacting a polycarboxylic acid or its derivative with a polyol which contains a phenolic resin having an oxyalkylene unit. The phenolic resin having an oxyalkylene unit is a reaction product of a phenolic resin and a compound possessing one epoxy ring in its molecular. The toner binder of the present invention is produced by using this polyester resin. As a polyester resin which may be used for a toner binder, preferred is one possessing, on the average, 2 to 15 oxyalkylene units in a molecule of the phenolic resin. As a phenolic resin, preferred is a phenolic resin of novolak type having a number average molecular weight of from 450 to 3000. As a toner binder, among the polyester resins, preferred is one having a glass transition temperature of from 30° to 85° C., and a softening temperature of from 70° to 160° C. Colorants, and if necessary, release agents, fluidity improvers, charge controlling agents, magnetic substances, and cross-linking agents may be added to this toner binder to provide a toner of this invention.

Among these additives, a cross-linking agent is effective for improving resistance to offset when added from 1 to 10 parts by weight based on the polyester resin as 100 parts by weight, and reacting with the polyester resin to cross-link the polyester resin.

Also the polyester resin of this invention may be used for production of polyurethanes, binder of glass fiber mat and carbon fiber mat, a coating material such as powder coating compound, curing agent of epoxy resin and the like.

DETAILED DESCRIPTION OF THE INVENTION

First, as a substance which constitutes a polyester resin of this invention, polycarboxylic acid and its derivative (A), and polyol (B) which contains a phenolic resin possessing an oxyalkylene unit, and its constituting proportion are described in order. The word, "polyester resin" refers a polyester resin of this invention illustrated hereinafter, unless otherwise specified.

In this invention, polycarboxylic acid or its derivative (A) includes dibasic carboxylic acid or its derivative, and there may be added tribasic or higher carboxylic acid or its derivative.

Specific examples of this dibasic carboxylic acid include:

(1) aliphatic dicarboxylic acids of 2 to 20 carbon atoms such as maleic acid, fumaric acid, succinic acid, adipic acid, cebacic acid, malonic acid, azelaic acid, mesaconic acid, citraconic acid, glutaconic acid, and the like;

(2) cycloaliphatic dicarboxylic acids of 8 to 20 carbon atoms such as cyclohexane dicarboxylic acid, methylnadic acid and the like;

(3) aromatic dicarboxylic acids of 8 to 20 carbon atoms such as phthalic acid, isophthalic acid, terephthalic acid, toluene dicarboxylic acid, naphthalene dicarboxylic acid and the like;

(4) either alkyl or alkenyl succinic acids possessing a hydrocarbon group of 4 to 35 carbon atoms as a side chain, such as isododecenylsuccinic acid, dodecenylsuccinic acid and the like; and (5) anhydrides or lower alkyl esters, methyl, butyl, e.g., of the above-mentioned dibasic carboxylic acids.

Among these substances, preferred are (1), (3), (4), and anhydrides or lower alkyl esters of these dicarboxylic acids, and especially preferred are maleic anhydride, fumaric acid, isophthalic acid, terephthalic acid, alkyl succinic acid, alkyl succinic anhydride, alkenylsuccinic acid, alkenyl succinic anhydride, and dimethylterephthalate. Maleic anhydride, and fumaric acid are preferred because of their more reactivity, and isophthalic acid and terephthalic acid are characterized in that they elevate a glass transition temperature of polyesters. Alkyl succinic acid, alkenyl succinic acid, and anhydrides of these succinic acids improve a property of a toner for dispersing a colorant into the toner containing a polyester resin employing these compounds.

Specific examples of tribasic or higher polycarboxylic acids include:

(1) aliphatic polycarboxylic acids of 7 to 20 carbon atoms such as 1,2,4-butanetricarboxylic acid, 1,2,5-hexanetricarboxylic acid, 1,3-dicarboxyl-2-methyl-2-methylenecarboxypropane, tetra(methylenecarboxyl)metane, 1,2,7,8-octanetetracarboxylic acid and the like;

(2) cycloaliphatic polycarboxylic acids of 9 to 20 carbon atoms such as 1,2,4-cycrohexanetricarboxylic acid and the like;

(3) aromatic polycarboxylic acids of 9 to 20 carbon atoms such as 1,2,4-benzenetricarboxylic acid, 1,2,5-benzenetricarboxylic acid, 2,5,7-naphthalenetricarboxylic acid and 1,2,4-naphthalene tricarboxylic acid, pyromellitic acid, benzophenontetracarboxylic acid and the like; and (4) anhydrides or lower alkyl esters (methyl, butyl, and the like) of the above-mentioned polycarboxylic acids. When using tribasic or higher polycarboxylic acid or its derivative, among the above-mentioned, preferred are polycarboxylic acids mentioned in (3) as well as anhydrides and lower alkyl esters of (3), especially, 1,2,4-benzenetricarboxylic acid, 1,2,5-benzenetricarboxylic acid as well as anhydrides and lower alkyl esters of these substances are preferred because they elevate resistance to offset for a toner containing a polyester resin wherein these compounds are employed. When using tribasic or higher polycarboxylic acids, proportion of usage based on (A) is ordinary from 0 to 30 mol %, preferably from 0 to 20 mol %, and further preferably from 0 to 10 mol %.

A polyol component (B) which is employed in this invention contains a phenolic resin possessing an oxyalkylene unit, and may also contain other dihydric, and trihydric or higher alcohols. A phenolic resin possessing an oxyalkylene unit is, usually, a reactant of a phenolic resin and a compound possessing an epoxy ring in its molecular. Types of this phenolic resin may be either a novolak type or a resol one. Moreover, a phenolic resin of resol type in liquid form or a phenolic resin of a benzilic ether type either having a viscosity for an extent of from 500 to 100,000 cps at 25° C., and a phenolic resin of water soluble resol type having a viscosity of its 70 wt. % solution for an extent of from 10 to 100,000 cps at 25° C. may be used. However, in general, a phenolic resin of novolak type is preferred to resol one. These types of phenolic resins are described, for example, in a paragraph of "Phenolic Resin" in Encyclopedia of Polymer Science and Technology (Interscience Publishers), vol. 10, page 1. Either a novolak type phenolic resin may be provided by employing, a catalyst, such inorganic acids as hydrochloric acid, phosphoric acid, sulfuric acid and the like; organic acids such as paratoluenesulfonic acid, oxalic acid and the like, or metal salts such as zinc acetate and the like; or resol type of phenolic resin may be provided by employing a catalyst, for example, ammonia; organic amine such as trimethylamine, ethylenediamine, and the like; a metallic hydroxide such as sodium hydroxide, pottasium hydroxide, and the like; and metallic oxide such as magnesium oxide as a catalyst. Both phenolic resins may be produced from phenols and aldehyde compounds. Moreover, there may be used phenolic resins of benzillic type (Jp. Pat. Appl. No. Sho 47-50873) which are produced by employing metallic salts such as lead naphthenate, zinc naphthenate, and the like as catalysts.

Phenols which may be used for this phenolic resin include phenol, substituted phenols and bisphenols possessing hydrocarbon group of 1 to 35 carbon atoms and/or one or more halogen groups as substituted groups. Examples of substituted phenols include cresol (ortho, meta, or para), ethylphenol, nonyl phenol, octyl phenol, phenylphenol, styrenated phenol, isopropenyl phenol, 3-chlorophenol, 3-bromophenol, 3,5-xylenol, 2,4-xylenol, 2,6-xylenol, 3,5-dichlorophenol, 2,4-dichlorophenol, 3-chloro-5-methylphenol, dichloroxylenol, dibromoxylenol, 2,4,5-trichlorophenol, 6-phenyl-2-chlorophenol, and the like. Examples of bisphenols include bisphenol A, bisphenol F and the like. Phenols may be used in combination of two or more. Among these phenols, preferred are phenol and substituted phenols, especially preferred are phenol, cresol, t-butyl phenol, styrenated phenol having one or two styrene units and nonyl phenol.

Aldehydes which may be used for a phenolic resin include, formalin (solution of formaldehyde in various degree of its concentration), for example, paraformaldehyde, trioxane, hexamethylenetetramine, and the like.

A number average molecular weight of phenolic resin is ordinary from 300 to 8,000, preferably from 350 to 3,000, and most preferably from 400 to 2,000. A number average for nuclide numbers (number of benzene ring) of phenolic resin is ordinary from 3 to 50, preferably from 4 to 20, and most preferably from 4 to 10. A softening temperature of a phenolic resin is, as measured by JIS K2531; Ring and Ball method, usually from 40° to 180° C., preferably from 40° to 150° C., and most preferably 50° to 130° C. When a softening temperature is below 40° C., it may be blocking at an ordinary temperature, and when a softening temperature exceeds 180° C., it may be hard to introduce an oxyalkylene unit because there arises difficulty for melting.

The other hand, specific examples of compounds which possess an epoxy ring may be ethylene oxide, 1,2-propylene oxide, 1,2-butylene oxide, 2,3-butylene oxide, isobutylene oxide, styrene oxide, epichlorohydrin, and the like. Glycidyl ether of aliphatic monohydric alcohol of 1 to 20 carbon atoms may be applicable as well. Among these oxirane compounds, preferred are ethylene oxide and/or 1,2-propylene oxide. In a phenolic resin which possesses an oxyalkylene unit, for each 1 mol of phenolic resin molecules, an average additional mol number of a compound possessing an epoxy ring for constituting an oxyalkylene unit is from 1 to 30 mol, preferably from 2 to 15 mol, and more preferably from 2.5 to 10 mol. And an average additional mol number of a compound possessing an epoxy ring for each phenolic hydroxyl group in a phenolic resin is from 0.1 to 10 mol, preferably from 0.1 to 4 mol, and more preferably from 0.2 to 2 mol. A number average molecular weight of a phenolic resin possessing an oxyalkylene unit is from 300 to 10,000, preferably from 350 to 5,000, and more preferably from 450 to 3,000. And its hydroxyl value, a sum of alcoholic and phenolic hydroxyl groups, is from 10 to 550, preferably from 50 to 500, and more preferably from 100 to 450 mgKOH/g. Among these hydroxyl groups, a phenolic hydroxyl value in a phenol resin possessing an oxyalkylene unit is from 0 to 500, preferably from 0 to 350, and more preferably from 5 to 250 mgKOH/g.

The phenolic resin which possesses an oxyalkylene unit may be produced in the absence of a catalyst, or in the presence of a basic catalyst, an acidic catalyst, e.g., by carrying out an addition reaction with a compound possessing an epoxy ring. The reaction temperature is from 20° to 250° C., and preferably from 70° to 200° C. The reaction may be carried out at atmospheric pressure or under pressure, and also it may be carried out in reduced pressure. The reaction may be carried out under the presence of a solvent such as xylene, dimethylformamide, and the like, or the above-mentioned dihydric alcohols and/or trihydric or higher alcohols which may be contained as a polyol component.

Said dihydric alcohols may include, for example:

(1) alkylene glycols of 2 to 12 carbon atoms such as ethylene glycol, 1,2-propylene glycol, 1,3-propylene glycol, 1,4-butanediol, neopentyl glycol, 1,4-butenediol, 1,5-pentanediol, 1,6-hexanediol, and the like;

(2) alkylene ether glycols such as diethylene glycol, triethylene glycol, dipropylene glycol, polyethylene glycol, polypropylene glycol, polytetramethylene glycol, and the like;

(3) cycloaliphatic diols of 6 to 30 carbon atoms such as 1,4-cyclohexanedimethanol, hydrogenated bisphenol A and the like; as well as (4) 2 to 8 mol alkylene oxide (ethylene oxide, propylene oxide, butylene oxide, and the like) adducts of the above-mentioned bisphenols such as bisphenol A, bisphenol F and bisphenol S.

Among the above-mentioned dihydric alcohols, preferred are (1) and (4), further preferred are ethylene glycol, 1,2-propylene glycol, and neopentyl glycol, 2 to 8 mol alkylene oxide adduct of bisphenol A, and 2 to 8 mols alkylene oxide adduct of bisphenol F. Ethylene glycol is preferred because it accelerates the rate of the reaction, and 1,2-propylene glycol and neopentyl glycol are preferred because their use results in excellent fixability at low temperature. A 2 to 4 mol alkylene oxide adduct of bisphenol A is preferred because it affords an excellent resistance to offset to a toner.

Specific examples of trihydric or higher alcohols may include:

(1) aliphatic polyhydric alcohols of 3 to 20 carbon atoms such as sorbitol, 1,2,3,6-hexanetetrol, 1,4-sorbitan, pentaerythritol, dipentaerythritol, tripentaerythritol, 1,2,4-butanetriol, 1,2,5-pentanetriol, glycerol, 2-methylpropanetriol, 2-methyl-1,2,4-butanetriol, trimethylolethane, trimethylol propane, and the like;

(2) aromatic polyhydric alcohols of 6 to 20 carbon atoms such as 1,3,5-trihydroxymethyl benzen and the like; as well as (3) alkylene oxide adducts of these alcohols.

Among these alcohols, preferred is (1), especially preferred are glycerol, trimethylol propane, and pentaerythritol.

Constituting weight proportion of a phenolic resin possessing an oxyalkylene unit/dihydric alcohols/trihydric or higher alcohols included in polyol components (B) is in a range of from 2 to 100/from 0 to 98/from 0 to 20; preferably from 4 to 70 /from 30 to 96/0 to 10; and more preferably from 4 to 50/from 50 to 96/from 0 to 5.

In accordance with the present invention, monocarboxylic acid, monoalcohol, and the like may be used with polycarboxylic acid and its derivative (A) and polyol component (B) for a purpose of adjusting a molecular weight or controlling a reaction. Specific examples of these compounds may include monocarboxylic acids such as benzoic acid, paraoxybenzoic acid, toluenecarboxylic acid, salicylic acid, acetic acid, propionic acid, and stearic acid, and the like; monoalcohols such as benzyl alcohol, toluene-4-methanol, cyclohexanemethanol, and the like.

Proportions of polycarboxylic acid and its derivative (A) to polyol component (B) both of which constitute the polyester resin of the present invention may be expressed with a ratio wherein hydroxyl group equivalent/carboxylic group equivalent ratio is 1/(from 0.6 to 1.4), preferably 1/(from 0.7 to 1.3), and more preferably 1/(from 0.8 to 1.2).

Constituting proportion of a phenolic resin possessing an oxyalkylene unit in a polyester resin of this invention is 1 weight % or more, preferably from 3 to 70 weight %, and further preferably from 5 to 40 weight %. If this proportion is less than 1 weight %, resistance to offset of a toner is insufficient.

Further, characteristics of said polyester resin which is a component of a toner binder of the present invention, and characteristics of a toner binder of the present invention are illustrated.

Said polyester resin of the present invention possesses an acid value (originated from carboxyl group) of from 0.5 to 30, preferably from 2 to 20 mgKOH/g, and a hydroxyl value (originated alcoholic hydroxyl group and phenolic hydroxyl group) of from 5 to 200, preferably from 10 to 100 mgKOH/g. When the acid value is below 0.5, it causes a decrease in electrostatic charge; when the acid value exceeds 30, it causes increasing dependence on humidity for electrostatic charge, and neither of these situations are not preferred. When the hydroxyl value is below 5, it results in a lowering of toner fixing at low temperature; when the hydroxyl value exceeds 200, it may cause increasing dependence on humidity for electrostatic charge, neither of which are preferred. Content of gel moiety, (substances insoluble to tetrahydrofuran), in the polyester resin is from 0 to 50 wt. %, and preferably from 0 to 25 wt. %, based on the weight of the polyester resin. When the content exceeds 50 wt.%, difficulty arises in the production of polyester.

The glass transition temperature (Tg) of the binder of the present invention is from 30° to 85° C., preferably from 40° to 80° C., and further preferably from 55° to 75° C. If Tg is below 30° C., it may tend to cause blocking or adhesion for toner grains, and if Tg exceeds 85° C., it reduces the fixing ability of the toner at low temperature. A softening temperature of a binder of the present invention is from 70° to 160° C., preferably from 80° to 150° C. When the softening temperature of a toner is below 70° C., it tends to lower the resistance to offset of a toner, and when the softening temperature exceeds 160° C., it reduces the fixing ability of the toner at low temperature. If a binder of the present invention consists only of said polyester resin of the present invention, the Tg and softening temperature of the polyester resin of the present invention may be in the above-mentioned range.

Components of a toner of the present invention wherein a toner binder of the present invention is contained are further illustrated.

A toner binder of the present invention composed of said polyester resin, and other resins for toner binder may be mixed, if necessary. The other resins for toner binder may include polystyrene, styrene-acryl copolymer, styrene-butadiene copolymer, epoxy resin, polyester resins other than the polyester resin of the present invention, and the like.

A binder of the present invention may be employed with colorants (C) or, if necessary, with other components (D) as a component for a toner.

Colorants (C) may include such pigments or dyes as carbon black, for example, nigrosine dye, aniline blue, red oxide, acetylene black, monoazo dye, diazo dye, quinacridone, anthraquinone dye, chalco oil blue, copper phthalocyanine, indanthrene blue, benzine yellow, chrome yellow pigment, ultramarine yellow, duPont oil red, indanthrene blue, permanent brown FG, brilliant scarlet, malachite green oxalate, lamp black, rose Bengal, pigment green B, rhodamine B, solvent 35; and other pigments or dyes described in Jp. Pat. No. Tokkai.

Hei. 1-277253, or Jp. Pat. No. Tokkai. Hei. 1-159759 except for the above-mentioned pigments or dyes. Colorants (C) are contained from 1 to 20 parts by weight based on the binder as 100 parts by weight, and preferably from 1 to 15 parts by weight.

Other components (D) are mentioned as following.

(1) Release agent (D1) (anti-offset agent)

Polyolefin such as polyethylene, polypropylene, and the like, of low molecular weight may be used.

Number average molecular weight of low molecular weight polyolefin is from 500 to 20,000, and its softening temperature (Ring and Ball Method) is from 80° to 180° C., preferably from 100° to 160° C. Melt viscosity of polyethylene (co)polymer is from 10 to 5,000 cps (at 140° C.), and melt viscosity of polypropylene is from 10 to 5,000 cps (at 160° C.). Also, there may be used higher fatty acid, higher fatty acid metal salt, higher fatty acid ester, partial saponified fatty acid ester, higher fatty alcohol, paraffin wax, polyamide wax, natural wax, ester of polyhidric alcohol, silicon varnish, aliphatic fluorocarbon, and the like. Most preferred is a wax having a softening temperature of from 60° to 150° C. (by Ring and Ball Method).

Proportion of use for (D1) is form 0 to 10 parts by weight based on the binder as 100 parts by weight, and preferably from 0.5 to 5 parts by weight.

(2) Charge controlling agent

There may be used conventionally known substances which are electrostatically charged in positive and/or in negative, such as nigrosine series dyes, metal containing dyes, and the like. There may be nigrosine dyes, metal-containing dyes, and the like, which are described in U.S. Pat. No. 4,933,252 by H. Nishikawa et al., and amount of use is ordinary from 0 to 100 parts by weight based on the binder as 100 parts by weight, and preferably from 0.1 to 5 parts by weight.

(3) Fluidity improver

There may be used inorganic particulates (primary particle diameter of 5 to 2 $\mu$m) such as silica fine powder, alumina, titanium oxide, barium titanate, magnesium titanate, calcium titanate, strontium titanate, zinc oxide, quarts sand, clay, mica, diatomaceous earth, chrome oxide, iron oxide red, antimony trioxide, magnesium sulfide, zirconium oxide, barium sulfide, calcium carbonate, nitrogen carbide, silicon nitride, and the like; among forementioned substances, preferred is silica fine powder, and most preferred is silica fine powder possessing a hydrophobic group such as higher hydrocarbon group in its surface. The amount of use is 0 to 5 parts by weight based on the binder as 100 parts by weight, preferably 0.01 to 2 parts by weight.

(4) Magnetic substance

Magnetic substances which are used for magnetic toner may include metals, alloys, and metal compounds containing of following substances such as ferrite, magnetite and chromium dioxide, and as well as iron, cobalt, nickel which show ferromagnetism; or alloys whose elements indicate ferromagnetism by certain heat-treating, such alloys, so called Heusler's alloy, as manganese-copper-aluminum and manganese-copper-stannum. These forementioned magnetic substances are homogeneously dispersed in the toner as a fine powder of 0.1 to 1 $\mu$m. The content of the magnetic substance when being used as magnetic toner is ordinary 15 to 80 parts by weight based on toner as 100 parts by weight, preferably 40 to 70 parts by weight.

Furthermore, a polyester resin of the present invention may be allowed to react with a cross-linking agent to improve toner's resistance to offset. That is, during a melt-kneading process for obtaining a toner, a toner binder of the present invention may be cross-linked into a part or the whole of a polyester resin of the invention which is a component of kneaded substance. Melt viscosity is elevated by cross-linking, and this results in further improving of resistance to offset for toner. Such cross-linking agents may include resol type phenolic resin, hexamethylenetetramine, and compounds containing polyvalent metals, (carboxylate or alcoxylate of polyvalent metals, organic metal complex, chelate compound, e.g.), of Al, Ba, Ca, Cd, Co, Cr, Cu, Fe, Mg, Mn, Ni, Pb, Sn, Sr, Zn, and the like; compounds possessing two or more epoxy groups in a molecule, peroxide and the like. Among the above-mentioned cross-linking agents, preferred are hexamethylenetetramine and compounds containing polyvalent metals. An amount of use for these cross-linking agents is from 0 to 10 parts by weight based on the binder as 100 parts by weight, preferably from 0 to 5 parts by weight, more preferably from 0 to 2 parts by weight.

The following illustrates methods for producing polyester resin of the present invention and a toner of the present invention.

Methods for producing a polyester resin are illustrated concretely with examples. First, polycarboxylic acid and its derivative (A) and polyol component (B) are mixed in a certain proportion, the mixture is allowed to maintain a condensation reaction, and thus the polyester resin of the present invention may be obtained. This reaction is carried out under the presence of catalyst at a temperature of from 150° to 300° C., and preferably from 170° to 280° C. As the reaction may be carried out under ordinary pressure, reduced pressure, or increased pressure, after the rate of the reaction is attained to a certain degree, inbetween 30 to 90%, e.g., it is preferred that the reaction is carried out under reduced pressure down to 200 mmHg, preferably down to 25 mmHg, and further preferably down to 10 mmHg.

The above-mentioned catalyst may be catalysts ordinarily used for esterification including such metals as tin, titanium, antimony, manganese, nickel, zinc, lead, iron, magnesium, calcium, germanium, and the like; and these metal including compounds (such as dibutyltin oxide, orthodibutyl titanate, tetrabutyltitanate, zinc acetate, lead acetate, cobalt acetate, sodium acetate, antimony trioxide, and the like).

Polyester resin of the present invention may be obtained by stopping the reaction when the characteristics of the reaction product, such as the, an acid value the softening temperature, and the like are attained at the desired degree, or when the agitation torque of a reacting equipment or agitation power are attained a certain degree.

Following illustrates a method of producing a toner for electrophotography employing a binder of the present invention, colorants (C), and, if necessary, other additives (D).

After the respective constituents beforementioned for toner are dry-blended, the blend is melt-kneaded by an extrusion kneader, the kneaded substance is cooled down and ground. Next the grinds are further ground into fine powders by a jet mill, the powders are classified into 3 to 30 $\mu$m, further adding a fluid improver, if necessary, and by homogeneously mixing thus prepared substance, there is obtained a toner.

After producing a polyester resin, phenolic hydroxyl groups in the polyester resin of the present invention may be allowed to react with organic metal complex, substrates of dyes or pigments, or to form a salt with tertiary amine or phosphine for a purpose of controlling electrostatic charge of a toner, particularly during a melt-kneading process.

Followings are described effects of the present invention.

(1) A polyester resin which is a component of a toner binder of the present invention possesses a structure wherein either a linear polyester or a slightly cross-linked polyester, which constitutes soft segments is grafted onto a phenolic resin of the novolak type, which constitutes hard segments, through at least one oxyalkylene unit, and also possesses a moderate elasticity at an elevated temperature without decreasing its excellent fluidity. Accordingly, a toner which employs a toner binder of the present invention is excellent in fixing ability at a lower temperature and in resistance to offset at elevated temperature, the toner possesses suitable characteristics required for a high-speed copying machine.

(2) A polyester resin which is a component of a toner binder of the present invention may optionally control not only an acid value, but also a phenolic hydroxyl value. Therefore, there is an advantage that the friction charge amount of a toner which employs a toner binder of the present invention may be alterable as desired.

(3) A polyester resin which is a component of a toner binder of the present invention possesses a higher Tg in spite of a lower softening temperature. Therefore, a toner which employs this polyester resin possesses an excellent storage stability.

(4) A polyester resin which is a component of a toner binder of the present invention possesses toughness. Therefore, a toner which employs this polyester resin possesses an improved abrasion-resistance in friction in-between a toner and a carrier, and an excellent durability.

(5) A polyester resin which is a component of a toner binder of the present invention possesses a novolak resin structure for its framework, and during the process of production of a toner, cross-linking through a methylene group and/or a phenolic hydroxyl group may be caused, and therefor may provide a toner which possesses an exceedingly excellent resistance to offset at an elevated temperature.

As the above-mentioned, a toner, wherein a toner binder of the present invention containing said polyester resin as a component is employed, may be utilized especially in a copying machine of various speed, printers, and the like.

The present invention is further embodied by following production examples, examples, examples for use, and comparative examples, however, this invention is not to be limited by these examples. All parts and % herein are respectively indicating weight parts and weight %, unless otherwise specified.

Respective materials which were used in the examples and comparative examples were abbreviated as following:

(1) Novolak A: Phenol novolak resin with a nuclide number of 4.4 (an average number of phenol nuclides in a molecular), and having a softening temperature of 81° C.
(2) Novolak B: Phenolic novolak resin with a nuclide number of 3.2, and having a softening temperature of 68° C.
(3) Novolak C: t-butylphenol novolak resin with a nuclide number of 5.0, and having a softening temperature of 110° C.
(4) Novolak D: o-cresolphenol novolak resin with a nuclide number of 7.2, and having a softening temperature of 97° C.
(5) Novolak E: Nonylphenol novolak resin with a nuclide number of 4.1, and having a softening temperature of 95° C.
(6) Glycol A: Polyoxypropylene (2.2)-2,2-bis(4-hydroxyphenyl) propane (of which hydroxyl group value of 315).
(7) Glycol B: Polyoxyethylene(2.3)-2,2-bis(4-hydroxyphenyl) propane (of which hydroxyl group value of 340).
(8) Glycol C: Poly(oxyethylene-oxypropylene)-bis-(4-hydroxyphenyl) methane (of which hydroxyl group value of 320).
(9) Glycol D: polyoxypropylene(3.1)-2,2-bis(4-hydroxyphenyl) propane (hydroxyl group value of 275).
(10) EG: Ethylene glycol
(11) NPG: Neopentyl glycol
(12) TPA: Terephthalic acid
(13) IPA: Isophthalic acid
(14) FA: Fumaric acid
(15) AA: Adipic acid
(16) DMT: Dimethyl terephthalate
(17) DSA: Dodecenylsuccinic anhydride
(18) TMA: Trimellic anhydride
(19) DBTO: Dibutyltin oxide.

Next, the followings illustrate methods for measuring characteristics of oxyalkylene ether of novolak type phenolic resin provided in the production examples, the examples and the comparative examples, and characteristics of polyester resin:

1. Acid number and hydroxyl value

A method which is specified in JIS K0070. Dioxane, tetrahydrofuran and the like were used as a solvent in case of that a sample was not dissolved.

2. Glass transition temperature (Tg)

A method which is specified in ASTM D3418-82, DSC Method, is used.

3. Softening temperature

The softening temperature was measured by Flow-testor (CFT-500, produced by Shimadzu Seisakusho Co., Ltd.), using a nozzle of 1.0 mm$\phi$×1.0 mm, under conditions of load: 10 kg, temperature raising speed: 5° C./min, then a temperature was determined when a half amount of the sample was extruded.

4. Molecular weight distribution

Molecular weight distribution is measured with gel-permeation chromatography (GPC).

A sample was kneaded by Labo Plastmill (produced by Toyo Seiki Industrials, Co., Ltd.) at a temperature of 120° C. for 30 minutes before in use.

Conditions for measurement of molecular weight were following:

Apparatus: HLC-802A, produced by Toyo Soda Co., Ltd.
Column: TSK gel, GMH6, two (produced by Toyo Soda Co., Ltd.)
Temperature of measurement: 25° C.
Sample solution: THF solution of 0.5 weight %
Injection amount of solution: 200 $\mu$l
Detector: Refractive index detector.

In addition, calibration curve of molecular weight was prepared with using standard polystyrene.

PRODUCTION EXAMPLE 1 (NE1)

Into an autoclave, 1 mol of novolak A (455 g) was placed, and an inlet air was substituted with nitrogen. Next, 1.5 g of triethylamine catalyst was added thereto, keeping a temperature at 120° C., 4.5 mol of PO (261 g) was added little by little, and the reaction was allowed to terminated. Volatile substance was removed and then oxyalkylene ether (NE1) was obtained.

Formulation of NE1 and its characteristics were shown on Table 1.

PRODUCTION EXAMPLE 2 (NE2)

Into a same reaction apparatus of Example 1, 1 mol of novolak A (455 g), 571 g of glycol D and 1.5 g of potassium hydroxide catalyst were added and mixed keeping a temperature at 120° C., and then 2 mol of propylene oxide (hereinafter abbreviated PO) (116 g) was added little by little and the reaction was allowed to be terminated. After the termination of the reaction, the catalyst was removed as usual method and volatile substance was further removed, then and a reactant was purified. Oxyalkylene ether (NE2) of novolak type phenolic resin which was diluted with glycol D was obtained.

Under the presense of alcoholic hydroxyl group and phenolic hydroxyl group, alkylene oxide (EO or PO) is known to preferentially add to phenolic hydroxyl group.

Prescription and characteristics of NE2 are shown on Table 1.

Production Examples from 3 to 8 (NE3 TO NE8)

Oxyalkylene ethers (NE3 to NE8) of novolak type phenolic resin were obtained by a same manner of Production example 1.

Formulation and characteristics of NE3 to NE8 are shown on Table 1.

Using a same type of reaction apparatus of Example 1, 1 mol of novolak D (850 g), 1 mol of bisphenol A (228 g), 10 g of trimethyl amine (30% solution) as a catalyst, and 265 g of PO, procedure of example 1 was repeated and oxyalkylene ether (NE9) of novolak type phenolic resin was obtained.

Formulation of NE9 and its characteristics are shown on Table 1.

stream. When a reactant became clear, decreasing a reaction temperature to 200° C. and then polyesterification reaction was continued under reduced pressure. Viscosity of the reactant was increased gradually, the reaction was stopped when a torque of an agitator showed a certain number, and then the polyester resin (A) of the present invention was obtained.

Formulation of resin A and its characteristics are shown on Table 2.

EXAMPLE 2 TO 7 (RESIN B TO G)

Using 0.05 parts of silicone series deforming agent (SAG-47 producted by Nihon Unicar Co., Ltd.), polyester resins B to G of the present invention were obtained by same manner of Example 1 except employing raw materials shown on Table 2.

Respective formulations of resins B to G and respective characteristics are shown on Table 2.

EXAMPLE 8 (RESIN H)

Into the same reaction vessel of Example 1, 264 parts of NPG, 146 parts of glycol A, 137 parts of glycol B, 53 parts of ether C-5 employed in Production Example 5, 266 parts of IPA, 264 parts of DMT, and 4 parts of tetrabutyltitanate were placed, and then allowed to react gradually rising a temperature at from 180° C. to 220° C. When transparency was appeared in an appearance of the reactant, 64 parts of TMA was added and the reaction was continued to be carried out under reduced pressure at 200° C. When the torque of the agitator showed a certain number, the reaction was allowed to stop, and then polyester resin H of the present invention was obtained.

Formulation of resin H and its characteristics are shown on Table 2.

EXAMPLE 9 (RESIN I)

Using raw materials as mentioned in Table 2, polyester resin I of the present invention was obtained in the same manner of Example 1. However, a reaction temperature was kept at from 180° C. to 200° C., and the reaction was allowed to stop when an acid value reached 17.

Formulation of the resin I and its characteristics are shown on Table 2.

TABLE 1

| Production Example | 1 | 2 | 3 | 4 | 5 | 6 | 7 | 8 | 9 |
|---|---|---|---|---|---|---|---|---|---|
| NE | NE1 | NE2 | NE3 | NE4 | NE5 | NE6 | NE7 | NE8 | NE9 |
| Novolac Resin | A | A | A | B | B | C | D | E | D |
| Weight (g) | 455 | 455 | 455 | 327 | 327 | 790 | 850 | 935 | 850 |
| Glycol D | — | 571 | — | — | — | — | — | — | — |
| Bisphenol A | — | — | — | — | — | — | — | — | 228 |
| EO | — | — | — | — | 154 | 88 | — | 110 | — |
| PO | 261 | 116 | 174 | 203 | — | — | 145 | 116 | 435 |
| Catalyst (Triethylamine) | 1.5*1 | 1.5 | 1.5 | 1.2 | 1.2 | 1.5 | 2.0 | 2.0 | 6.0*2 |
| Hydroxyl No. (mg KOH/g) | 341 | 350 | 383 | 332 | 369 | 308 | 396 | 192 | 334 |

Remarks
*1 Instead of triethylamine, potassium hydroxide was used as a catalyst.
*2 INstead of triethylamine, trimethylamine was used as a catalyst.

EXAMPLE 1 (Resin A)

Into a reaction vessel whereto a thermometer, an agitator equipping a torque detector, a cooling apparatus, and a nitrogen introducing inlet were equipped, 940 parts of glycol D, 60 parts of NE 1, 376 parts of TPA, and 3.5 parts of DBTO were placed, and allowed to react at a temperature of 230° C. under the nitrogen shown on Table 2.

EXAMPLE 10 (RESIN J)

Into the same reaction apparatus, 950 parts of glycol B and 434 parts of TPA were praced, and allowed to react at a temperature of 230° C. until an acid value reached 1.5. Next, the reactant was cooled to 190° C., 50 parts of NE9 which was obtained in Production Example 9 and 21 parts of DSA were added, further polyesterification reaction was carried out therein. The viscosity of the reactant was gradually increased, the reaction was allowed to stop when the torque of the agitator showed a certain number, and then polyester resin (J) of the present invention was obtained.

Formulation of the resin J and its characteristics are shown on Table 2.

[9], fluidity improver was further added thereto after classification, mixed by Henschel mixer, and then the toner was obtained.

* Carbon black "Carbon Black MA-100, produced by Mitsubishi Chemical Ind. Co., Ltd.
* Chromatic color pigment "Fastgen Magenta R-11, produced by Dainihon-inki Chemical Ind., Co., Ltd."
* Charge controller agent "Aizen Spiron Black TRH, produced by Hodogaya Chemical Ind. Co., Ltd."

TABLE 2

| Example | 1 | 2 | 3 | 4 | 5 | 6 | 7 | 8 | 9 | 10 |
|---|---|---|---|---|---|---|---|---|---|---|
| Polyester Resin | A | B | C | D | E | F | G | H | I | J |
| Component A part | | | | | | | | | | |
| TPA | 376 | 397 | 349 | | 324 | 362 | | | | 434 |
| IPA | | | | 392 | | | | 226 | | |
| DMT | | | | | | | 312 | 264 | | |
| AA | | | | | | | 26 | | | |
| FA | | | | | | | | | 298 | |
| DSA | | | | | | 89 | | | | 21 |
| TMA | | | | | | | | 64 | | |
| Component B part | | | | | | | | | | |
| Glycol A | | | | 600 | 700 | | 415 | 146 | 900 | |
| Glycol B | | 315 | | | | | – | 137 | | 950 |
| Glycol C | | | | | | 320 | | | | |
| Glycol D | 940 | 385 | 600 | | | | | | | |
| EG | | | | | | | 31 | | | |
| NPG | | | | | | | | 264 | | |
| NE | 60 (NE1) | 100 (NE3) | 400 (NE2) | 400 (NE2) | 300 (NE7) | 200 (NE6) | 47 (NE4) | 53 (NE5) | 100 (NE8) | 50 (NE9) |
| Acid No. (mg KOH/g) | 3.0 | 4.1 | 3.5 | 3.8 | 6 | 2.1 | 1.3 | 12 | 15 | 6.7 |
| Tg (°C.) | 60 | 61 | 62 | 70 | 58 | 57 | 57 | 59 | 58 | 57 |
| Soft. Temp (°C.) | 126 | 130 | 131 | 138 | 125 | 126 | 127 | 130 | 90 | 140 |

COMPARATIVE EXAMPLE 1 (RESIN K)

As same procedure of Example 1 was repeated except for 60 parts of NE1 was replaced with 60 parts of trimethylolpropane, there was obtained comparative polyester resin K.

An acid number of the polyester resin K was 4.5, its Tg was 58° C., and its softening point was 132° C.

COMPARATIVE EXAMPLE 2 (RESIN L)

Into the same procedure reaction apparatus of Example 1, 950 parts of glycol B and 434 parts of TPA were placed, and the mixture was allowed to react at 230° C. until its acid number reached 1.5. Next, the reaction solution was cooled to 190° C., 100 parts of TMA instead of 50 parts of NE9 which was obtained in Production Example 9 was added thereto, and polyesterification reaction was further carried out. As the viscosity of the reactant was gradually increased and the torque of the agitator reached at a point showing a certain number, the reaction was allowed to stop, and then the comparative polyester resin L was obtained.

An acid number of the polyester resin L was 21, its Tg was 64° C., and its softening point was 143° C.

EXAMPLES FOR USE 1 TO 10 AND COMPARATIVE EXAMPLES 1 AND 2

As for binders, using polyester resins of A to L which were obtained in the examples of 1 to 10 and the comparative examples of 1 and 2; after toner components of the following composition were milled in a ball mill by following way of Table 3, the mixture was melted and kneaded by an extrusion kneader, at 120°~130° C.; after the kneaded substance was cooled down, grinded, pulverized and classified, and then toners of [1] to [13] whose average particle size was approximately 12 μm were respectively obtained. However as for the toner

* Release agent "Viscol 660 P produced by Sanyo Chemical Ind. Co., Ltd."
* Fluidity improver "Colloidal Silica R972, produced by Japan Aerogil Co., Ltd."
* Cross-linking agent Hexamethylene tetramine.

Characteristics of the obtained toners of [1] to [13] were evaluated in the following methods.

(1) Friction charge amount 4 g of an obtained toner and 96 g of ferrite carrier F-100 (produced by Nihon Teppun Co., Ltd.) were agitated 20 minutes, and then friction charge amount was measured by blow off charge detector produced by Toshiba Chemical Co., Ltd.

30 g of toner and 720 g of ferrite carrier F-100 were mixed to adjust a developer, printing image test was carried out by duplicator of process speed of 150 mm/sec with varying temperature of the heat-roller, and then minimum fixing temperature and hot offset temperature were obtained.

Minimum fixing temperature herein was, employing a friction testor specified in JIS L0849-1971, a temperature of a heat-roller wherein fixing surface of toner was rubbed with a rubbing white cotton cloth for 10 times, then optical density of an image surface was measured with a Macbeth reflection densitometer before and after rubbing, and fixing rate which was calculated from following equation exceeds 70%.

Fixing rate (%) = (density of an image after rubbing)/

(density of the image before rubbing) × 100

Also, hot offset temperature was a temperature of heat roller which was observed any spot on a followed copy-paper by visual observation whether there was.

(3) Store stability 10 g of toner was poured into a glass tube, leaving it for 24 hours under the condition of 50° C.×40% RH, and then resulted substances were ranking into 4 grades according to the degree of toner coagulation.

Grade A—no coagulation

Grade B—few coagulation, but redispersing when giving a light shock to the glass tube.

Grade C—approximately one fourth of toner was coagulated, no redispersing if giving a slightly light shock to a screw tube.

Grade D—Degree of coagulation was remarkable and no redispersing if giving a strong striking to the screw tube.

(4) Resistance to migration of plasticizer

Fixed image was put in-between vinyl chloride sheets, and left the sheets under the condition of 20 g/cm$^2$ loading at 40° C. for a week, and then the resultant was evaluated from whether there were any spot on the image and on the vinyl chloride sheets or no spot.

The collecting results of evaluating characteristics of toner [1] to [13] are shown on Table 3-a and 3-b.

TABLE 3

| | Example for Use | | | | | |
|---|---|---|---|---|---|---|
| Toner | 1 [1] | 2 [2] | 3 [3] | 4 [4] | 5 [5] | 6 [6] |
| Composition of Toner (parts) | | | | | | |
| Resin | A | B | C | D | E | F |
| Parts | 87 | 87 | 87 | 87 | 87 | 87 |
| Carbon Black | 8 | 8 | 8 | 8 | 8 | 8 |
| Chromatic Color Pigment | | | | | | |
| Charge Controlling agent | 1 | 1 | 1 | 1 | 1 | 1 |
| Release Agent | 4 | 4 | 4 | 4 | 4 | 4 |
| Cross-linking Agent | | | | | | |
| Fludiity Improver | | | | | | |
| Characteristics of Toner | | | | | | |
| Friction Charge Amount (μC/g) | −15 | −18 | −13 | −20 | −21 | −24 |
| Minimum Fixing Temp. (°C.) | 137 | 147 | 142 | 145 | 136 | 133 |
| Offset Appearance Temp. (°C.) | 210 | 220 | 210 | 205 | 210 | 205 |
| Store Stability | A | ← | ← | ← | ← | ← |
| Resist. to Mig. of Plas. | Yes | ← | ← | ← | ← | ← |

| | Example for Use | | | | | Comp. Ex. | |
|---|---|---|---|---|---|---|---|
| Toner | 7 [7] | 8 [8] | 9 [9] | 10 [10] | 11 [11] | 1 [12] | 2 [13] |
| Composition of Toner (parts) | | | | | | | |
| Resin | G | H | I | J | F | K | L |
| Part | 87 | 87 | 95 | 87 | 87 | 87 | 87 |
| Carbon Black | 8 | 8 | | 8 | 8 | 8 | 8 |
| Chromatic Color Pigment | | | 5 | | | | |
| Charge Controlling Agent | 1 | 1 | | 1 | 1 | 1 | 1 |
| Release Agent | 4 | 4 | | 4 | 4 | 4 | 4 |
| Cross-linking Agent | | | | | 1 | | |
| Fluidity Improver | | | 0.5 | | | | |
| Characteristics of Toner | | | | | | | |
| Frict. Ch. Amt. (μC/g) | −17 | −18 | −16 | −23 | −22 | −17 | −19 |
| Min. Fixing Temp. (°C.) | 152 | 153 | 118*1 | 142 | 142 | 155 | 167 |
| Offset App. Temp. (°C.) | ≧240 | ≧240 | 200*1 | 215 | 240 | 180 | 210 |
| Store Stability | A | ← | ← | ← | ← | B | A |

TABLE 3-continued

| Resist. to Mig. of Plas. | yes | ← | ← | ← | ← | no | yes |
|---|---|---|---|---|---|---|---|

Remark:
*1 Evaluated by a heat-roller made of silicone rubber and fixing apparatus having a devise of silicon oil supplier.

It is obvious according to Table 3 that a toner whose binder employed polyester resin of the present invention is excellent in toner quality for fixation (minimum fixation temperature and resistance to offset), store stability, resistance to migration of plasticizer, and the like.

Moreover, toner [12] (Comparative Example 1), wherein polyester resin which was cross-linked with trihydric alcohol (trimethylol propane) was used as a binder, is inferior to the toner concerning to the present invention for the points of resistance to offset, shelf stability, and resistance to migration of plasticizer. Toner [13] (Comparative Example 2) which employed polyester resin being cross-linked with tribasic carboxylic acid (trimellitic acid anhydride) as a binder is inferior to a toner concerning to the present invention in low temperature fixing.

Concerning a toner [1] and a toner [2] Example 1 and Example 2 on Table 3, continuous copying for 10,000 sheets were practiced. Picture quality after copying for 10,000 sheets was same quality as the beginning. A toner which employs polyester resin of the present invention keeps good quality in spite of friction for long time and it is obvious that the toner is excellent for durability.

What is claimed is:

1. A polyester resin having a hydroxyl value ranging from 10 to 100, obtained from a reaction employing a polycarboxylic acid or its derivative, and a polyol comprising a phenolic resin possessing an oxyalkylene unit, wherein said phenolic resin has a nuclide number of 3 to 20.

2. A toner binder resin for electrophotography comprising a polyester resin having a hydroxyl value ranging from 10 to 100, wherein the resin is obtained from a polycarboxylic acid or its derivative, and a polyol comprising a phenolic resin possessing an oxyalkylene unit, wherein said phenolic resin has a nuclide number of 3 to 20 and a colorant.

3. A polyester resin according to claim 1, wherein said phenolic resin possesses oxyalkylene units of from 2 to 15 on the average.

4. A polyester resin according to claim 1, wherein said oxyalkylene unit includes an oxyethylene unit, or an oxypropylene unit.

5. A toner binder resin according to claim 2, wherein the phenolic resin is a phenolic resin of novolak type.

6. A polyester resin according to claim 1, wherein a total hydroxyl value of a phenolic resin possessing an oxyalkylene unit is from 50 to 500.

7. A polyester resin according to claim 5, wherein said phenolic resin of novolak type is derived from a phenol compound selected from a group consisting of phenol, cresol, t-butylphenol, styrenated phenol, and nonyl phenol; and a compound possessing an aldehyde group selected from a group consisting of formalin, paraformaldehyde, trioxane, and hexamethylenetetramine.

8. A polyester resin according to claim 5, wherein a number average molecular weight of the phenolic resin of novolak type is from 350 to 3,000.

9. A polyester resin according to claim 1, wherein the polycarboxylic acid and its derivative are selected from a group consisting of maleic acid, maleic anhydride, alkylsuccininc acid, alkylsuccininc anhydride, alkenylsuccinic acid, alkenylsuccinic anhydride, fumaric acid, phthalic acid, phthalic anhydride, isophthalic acid, terephthalic acid, and dimethyl terephthalate.

10. A polyester resin according to claim 1, wherein the polyester resin possesses a glass transition temperature of from 30° to 85° C., and a softening temperature of from 70° to 160° C.

11. A polyester resin according to claim 1, wherein the polyester resin possesses a hydroxyl value of from 10 to 100, and an acid value of from 0.5 to 30.

12. A polyester resin according to claim 1, wherein said polyester resin possesses a molecular weight at peak-top of from 3,500 to 12,000 measured by gel permeation chromatography.

13. A polyester resin according to claim 1, wherein the polyol comprises a diol selected from a group consisting of ethylene glycol, 1,2-propylene glycol, neopentylglycol, 2 to 4 mol of alkylene oxide adduct of bisphenol A, and 2 to 4 mol of alkeylene adduct of bisphenol F.

14. A polyester resin according to claim 1, wherein said polyester is resin cross-linked by a cross-linking agent of from 1 to 10 parts by weight based on weight of a polyester resin as 100 parts by weight.

15. A polyester resin according to claim 14, wherein the cross-linking agent is selected from a group consisting of a resol type phenolic resin, hexamethylenetetramine, polyvalent metallic carboxylate, polyvalent metallic alcoxylate, organic metal complex and epoxy compound.

16. A toner being composed of a polyester resin according to claim 14 and colorants of 1 to 20 parts by weight based on said polyester resin weight as 100 parts by weight.

17. A toner according to claim 16 further comprising at least one substance selected from a group consisting of a release agent of 0.5 to 10 parts by weight, a magnetic substance of 40 to 70 parts by weight, a charge controlling agent of 0.1 to 5 parts by weight, and a fluidity improver of 0.01 to 2 parts by weight based on weight of said binder as 100 parts by weight.

18. A toner being composed of a polyester resin according to claim 1 and colorants of 1 to 20 parts by weight based on said binder weight as 100 parts by weight.

19. A toner according to claim 18 further comprising at least one substance selected from a group consisting of a release agent of 0.5 to 10 parts by weight, a magnetic substance of 40 to 70 parts by weight, a charge controlling agent of 0.1 to 5 parts by weight, and a fluidity improver of 0.01 to 2 parts by weight based on weight of said binder as 100 parts by weight.

* * * * *